(12) United States Patent
Chatelain et al.

(10) Patent No.: US 9,721,260 B2
(45) Date of Patent: Aug. 1, 2017

(54) METHOD AND APPARATUS FOR MARKING MANUFACTURED ITEMS

(75) Inventors: Philippe Chatelain, Chavornay (CH); Patrick Chanez, Cheyres (CH); Erwan Fradet, Denens (CH); Alain Sager, Bossonnens (CH)

(73) Assignee: INEXTO SA, Lausanne (CH)

( * ) Notice: Subject to any disclaimer, the term of this patent is extended or adjusted under 35 U.S.C. 154(b) by 910 days.

(21) Appl. No.: 13/977,194

(22) PCT Filed: Dec. 21, 2011

(86) PCT No.: PCT/EP2011/073588
§ 371 (c)(1),
(2), (4) Date: Nov. 4, 2013

(87) PCT Pub. No.: WO2012/089582
PCT Pub. Date: Jul. 5, 2012

(65) Prior Publication Data
US 2014/0046852 A1    Feb. 13, 2014

(30) Foreign Application Priority Data

Dec. 30, 2010    (EP) .................................... 10252258

(51) Int. Cl.
*G06Q 30/00* (2012.01)
*G06Q 10/06* (2012.01)
(Continued)

(52) U.S. Cl.
CPC ......... *G06Q 30/0185* (2013.01); *G06Q 10/06* (2013.01); *G06Q 10/087* (2013.01);
(Continued)

(58) Field of Classification Search
CPC .......................... G06Q 30/0185; G06Q 10/087
See application file for complete search history.

(56) References Cited

U.S. PATENT DOCUMENTS

| 4,035,615 A | 7/1977 | Best et al. |
| 4,094,244 A | 6/1978 | Edwards et al. |
| (Continued) | | |

FOREIGN PATENT DOCUMENTS

| BG | 61241 B1 | 3/1997 |
| BG | 63518 B | 3/2002 |
| (Continued) | | |

OTHER PUBLICATIONS

"Symmetric-key algorithm"—article from Wikipedia.
(Continued)

*Primary Examiner* — Saleh Najjar
*Assistant Examiner* — Louis Teng
(74) *Attorney, Agent, or Firm* — McCormick, Paulding & Huber LLP (57) ABSTRACT

A method and apparatus includes providing a cryptographic key, in an inactive state, to a point in a supply chain for manufactured items, providing the cryptographic key, in an active state, and an activation code for activating the cryptographic key, to a verification center, and providing the activation code to the point in the supply chain in response to the point in the supply chain transmitting information relating to the received cryptographic key. The method includes generating, at the point in the supply chain, an identification (ID) code for each manufactured item, derived from the cryptographic key in the active state and a dynamic key generated for each batch of manufactured items. Including providing the dynamic key for each batch of manufactured items to the verification center, marking each manufactured item with the ID code, and counting the actual or correct number of ID codes marked on the manufactured items.

14 Claims, 4 Drawing Sheets

(51) Int. Cl.
*G06Q 10/08* (2012.01)
*H04L 9/08* (2006.01)
*H04L 9/32* (2006.01)

(52) U.S. Cl.
CPC ............ *H04L 9/083* (2013.01); *H04L 9/0816* (2013.01); *H04L 9/0819* (2013.01); *H04L 9/0869* (2013.01); *H04L 9/32* (2013.01)

(56) References Cited

U.S. PATENT DOCUMENTS

| | | |
|---|---|---|
| 4,354,101 A | 10/1982 | Hester et al. |
| 4,463,250 A | 7/1984 | McNeight et al. |
| 4,529,871 A | 7/1985 | Davidson |
| 4,860,226 A | 8/1989 | Martin et al. |
| 4,963,719 A | 10/1990 | Brooks et al. |
| 5,382,779 A | 1/1995 | Gupta |
| 5,467,433 A | 11/1995 | Lamprecht, Jr. et al. |
| 5,621,864 A | 4/1997 | Benade et al. |
| 5,767,498 A | 6/1998 | Heske, III et al. |
| 5,805,779 A | 9/1998 | Christopher et al. |
| 5,837,983 A | 11/1998 | Actis et al. |
| 5,850,080 A | 12/1998 | Herzig |
| 5,892,900 A | 4/1999 | Ginter et al. |
| 5,930,215 A | 7/1999 | Fite et al. |
| 6,069,955 A | 5/2000 | Coppersmith et al. |
| 6,122,403 A | 9/2000 | Rhoads |
| 6,134,561 A | 10/2000 | Brandien et al. |
| 6,212,638 B1 | 4/2001 | Lee et al. |
| 6,217,966 B1 | 4/2001 | Finster et al. |
| 6,226,619 B1 | 5/2001 | Halperin et al. |
| 6,260,029 B1 | 7/2001 | Critelli |
| 6,272,634 B1 | 8/2001 | Tewfik et al. |
| 6,442,276 B1 | 8/2002 | Doljack |
| 6,712,275 B1 | 3/2004 | Borg |
| 6,892,947 B1 | 5/2005 | Jam et al. |
| 6,963,846 B1 | 11/2005 | Kelly et al. |
| 6,996,543 B1 | 2/2006 | Coppersmith et al. |
| 7,188,258 B1 | 3/2007 | Aggarwal et al. |
| 7,246,748 B1 | 7/2007 | Feuerman et al. |
| 7,283,630 B1 | 10/2007 | Doljack |
| 2002/0053796 A1 | 5/2002 | McCann et al. |
| 2002/0091593 A1 | 7/2002 | Fowler |
| 2002/0158133 A1 | 10/2002 | Conzola et al. |
| 2002/0158137 A1 | 10/2002 | Grey et al. |
| 2003/0004946 A1 | 1/2003 | VanDenAvond et al. |
| 2003/0042312 A1 | 3/2003 | Cato |
| 2003/0051767 A1 | 3/2003 | Coccaro et al. |
| 2003/0074223 A1 | 4/2003 | Hickel et al. |
| 2003/0126034 A1 | 7/2003 | Cheney et al. |
| 2004/0024790 A1 | 2/2004 | Everett |
| 2004/0084530 A1 | 5/2004 | McQueen et al. |
| 2004/0117265 A1 | 6/2004 | Hoffman |
| 2004/0172260 A1 | 9/2004 | Junger et al. |
| 2005/0011956 A1 | 1/2005 | Carlson |
| 2005/0097054 A1* | 5/2005 | Dillon .................. G06Q 10/08 705/51 |
| 2005/0108044 A1 | 5/2005 | Koster |
| 2005/0190914 A1 | 9/2005 | Chen et al. |
| 2005/0234823 A1 | 10/2005 | Schimpf |
| 2005/0273434 A1* | 12/2005 | Lubow ................. G06Q 10/087 705/59 |
| 2006/0011726 A1 | 1/2006 | Chen et al. |
| 2008/0046263 A1 | 2/2008 | Sager et al. |
| 2010/0064142 A1 | 3/2010 | Matsuzaki |
| 2010/0258641 A1 | 10/2010 | Yu |
| 2011/0093113 A1* | 4/2011 | Sager ..................... G06K 17/00 700/115 |
| 2012/0130868 A1 | 5/2012 | Loken |
| 2013/0226326 A1 | 8/2013 | Yoshida et al. |
| 2014/0046852 A1 | 2/2014 | Chatelain et al. |
| 2014/0173688 A1 | 6/2014 | Fischer et al. |
| 2014/0367464 A1 | 12/2014 | Herzig |

FOREIGN PATENT DOCUMENTS

| | | |
|---|---|---|
| DE | 10100248 A1 | 7/2002 |
| EP | 1645992 | 4/2006 |
| EP | 1645992 A1 | 4/2006 |
| EP | 1046276 B1 | 7/2007 |
| GB | 2342743 | 4/2000 |
| GB | 2342743 A | 4/2000 |
| JP | 5319621 B2 | 10/2013 |
| RU | 2183349 C1 | 6/2002 |
| WO | 2010140892 | 12/2010 |

OTHER PUBLICATIONS

A. Menezes, P. van Oorschot, and S. Vanstone: "Handbook of Applied Cryptography" CRC Press LLC, Boca Raton, London & New York 1997. (excerpts).
Applied Cryptography, Second Edition—Protocols, Algorithms and Source Code in C—Bruce Schneier, John Wiley & Sons, Inc. (excerpts).
"Authenticate"—definition from Merriam-Webster.
"Authentication"—article from Wikipedia.
C. H. Meyer and S. M. Matyas: "Some Cryptographic Principles of Authentication in Electronic Funds Transfer Systems" (in: SIGCOMM '81 Proceedings of the Seventh Symposium on Data Communications; pp. 73-88, 1981.
C. H. Meyer and S. M. Matyas: "Cryptography: A new dimension in computer data security," John Wiley & Sons, New York et al., 1982. (excerpts).
"Database index"—article from Wikipedia.
"Derive"—definition form Merriam-Webster.
"Digital signature"—article from Wikipedia.
"During"—definition from Merriam-Webster.
European Search Report for EP10252258, dated Jun. 24, 2011.
International Search Report for PCT/EP2011/073588, dated Apr. 5, 2012.
F. Piper & S. Murphy: "Cryptography—A Very Short Introduction," Oxford University Press Inc., New York, 2002. (excerpts).
H. X. Mel & D. Baker: "Cryptography Decrypted," Addison-Wesley, Boston et al., 2001. (excerpts).
"Index mapping"—article from Wikipedia.
International Standard, ISO 12931, First Edition Dated Jun. 1, 2012: "Performance criteria for authentication solutions used to combat counterfeiting of material goods."
"Message authentication code"—article form Wikipedia.
Presentation 1—Technology for protection by multimedia multi-stage encrypted marks of documents, securities and goods against counterfeit—Keit LTD, Bulgaria.
Presentation 2—Technology for protection by multimedia multi-stage encrypted marks of documents, securities and goods against counterfeit—Keit LTD, Bulgaria.
"Salt (Cryptography)"—article from Wikipedia.
"Store"—definition from Merriam-Webster.
"Substitution cipher"—article from Wikipedia.
"Taggant"—article from Wikipedia.
W. Mao: "Modern Cryptography—Theory & Practice," Prentice Hall and Hewlett Packard Books, 2004. (excerpts).
Webster's New Collegiate Dictionary, G. & C. Merriam Co., 1981. (excerpts).
International Search Report dated May 4, 2012.
Chapter 3: Historical Algorithms: Simple examples. Historical algorithms.
Yasuo Hosogai et al.: Study of Data Protection and Encryption, 1st ed., Japan, Nikkei Inc., Jul. 29, 1983, pp. 153-165.
International Search Report for PCT Serial No. PCT/EP2016/052008 dated Mar. 10, 2016.
International Search Report for PCT Serial No. PCT/EP2016/070137 dated Nov. 21, 2016.

* cited by examiner

METHOD AND APPARATUS FOR MARKING MANUFACTURED ITEMS

CROSS REFERENCE TO RELATED APPLICATIONS

The application is entitled to the benefit of and incorporates by reference essential subject matter disclosed in International Application No. PCT/EP2011/073588 filed on Dec. 21, 2011 and European Patent Application No. 10252258.8 filed on Dec. 30, 2010.

FIELD OF THE INVENTION

The present invention relates to methods and apparatus for marking manufactured items. En particular, the present invention relates to marking packaged goods, for example packs or cartons of cigarettes and other tobacco products.

BACKGROUND OF THE INVENTION

Contraband and counterfeit goods cause a significant loss of revenue to producers and to government authorities. Counterfeit goods of inferior quality which are illegally sold are also detrimental to the customer and to the manufacturer. Customers are affected because they could obtain goods of inferior quality which may be hazardous. This is particularly important for products such as pharmaceuticals. Manufacturers are affected because they may suffer a loss of reputation, an increase in competition with their own products, and infringement of other legal rights. Contraband goods, which are goods manufactured for the purposes of evading taxes or government regulations, are also a considerable problem for producers and government authorities. These goods are illegally traded or imported and can result in significant losses in revenue.

The problems of contraband and counterfeiting are also particularly acute for goods subject to taxation, for example tobacco products. The problems also exist for many other kinds of traded products carrying a strong brand value. These include many internationally traded products such as perfumes, alcohols, watches and luxury goods. So, manufacturers, customers, distributors, wholesalers, importers, government authorities and other authorized parties need to be able to verify easily that particular goods are genuine. Moreover, government authorities and other authorized parties need to be able to verify easily that the volume of items manufactured adheres to authorized volumes, particularly for goods subject to taxation. Government authorities and other authorized parties further need to be able to verify tax status for goods subject to taxation and protect revenues derived from such taxation.

There exists a need for an improved method and apparatus for marking manufactured items, particularly one which can be used for tax verification, production volume verification and authentication of manufactured items.

SUMMARY OF THE INVENTION

According to a first aspect of the invention, there is provided a method of marking manufactured items, comprising: providing a cryptographic key in an inactive state to a point in a supply chain for the manufactured items; providing the cryptographic key in an active state and an activation code for activating the cryptographic key in the inactive state to form the cryptographic key in the active state, to a verification centre; providing the activation code to the point in the supply chain in response to the point in the supply chain transmitting information relating to the received cryptographic key, the activation code allowing the cryptographic key in the inactive state at the point in the supply chain to be activated to form the cryptographic key in the active state; generating, at the point in the supply chain, an identification (ID) code for each manufactured item, the ID code being derived from the cryptographic key in the active state and a dynamic key generated for each batch of manufactured items; providing the dynamic key for each batch of manufactured items to the verification centre; marking each manufactured item with the ID code; and counting the number of ID codes marked on the manufactured items.

The invention provides an improved method for marking manufactured items. This method may be used for tax verification (for manufactured items which are subject to taxation), for production volume verification and for authenticating manufactured items. One ID code is marked on each manufactured item, such that each manufactured item can be uniquely identified. Counting the number of ID codes marked on the manufactured items ensures that rejected or removed manufactured items are not identified. That is to say, the correct or actual number of manufactured items marked is counted.

The manufactured items may be any manufactured items, including tobacco products, such as cigarette packs or cigarette cartons, or other items carrying a strong brand value or subject to taxation. The point in the supply chain may comprise any location, site, place or position within a supply chain for the manufactured items. For example, the point in the supply chain may comprise an importation point, a distribution point, a purchaser, a wholesaler or any other link in the supply chain. Most preferably, however, the point in the supply chain comprises a production centre or production line for the manufactured items.

The step of marking each manufactured item may comprise ink jet printing, holographic printing, laser printing or any other printing or marking that allows printing or marking of the ID codes on each item. The step of marking each manufactured item may comprise printing or marking each item, printing or marking external packaging, printing or marking adhesive labels or tags or any other appropriate printing or marking. The point in the supply chain may comprise a sensor for detecting the marked ID codes on manufactured items. The sensor may confirm that each ID code has been properly marked on the manufactured item. The sensor may count only the number of ID codes properly marked on the manufactured items.

In one embodiment, the cryptographic key is generated in a key generator separate from the point in the supply chain.

The cryptographic key is simply any piece of information (for example a number) which can be used in combination with other parameters to form a code. The cryptographic key in the active state is preferably the cryptographic key in an unencrypted state. The cryptographic key in the inactive state is preferably the cryptographic key in an encrypted state. Thus, the activation code is preferably a decryption mechanism to convert the encrypted key into the unencrypted key. The cryptographic key may include a number of portions including a plurality of secret codes.

The step of providing the cryptographic key in an inactive state to a point in a supply chain may comprise sending the cryptographic key in the inactive state from the key generator to the point in the supply chain on a non-volatile data support. The non-volatile data support is a data support including non-volatile computer memory, that is to say, computer memory that can retain the stored information even when not powered. Examples include, but are not limited to, a CD-Rom, a DVD-Rom or a removable hard disk. Alternatively, the step of providing the cryptographic key in an inactive state to a point in a supply chain may comprise providing the cryptographic key in the inactive state via a secure network connection.

The key generator preferably forms part of the verification centre. In that case, the step of providing the cryptographic key in an active state and the activation code to the verification centre may comprise storing the cryptographic key and the activation code in a database accessible to the verification centre. No transfer of the cryptographic key or the activation code is required.

The step of providing the activation code to the point in the supply chain preferably comprises sending the activation code from the verification centre to the point in the supply chain.

The step of the point in the supply chain transmitting information relating to the received cryptographic key preferably comprises sending information relating to the received cryptographic key from the point in the supply chain to the verification centre.

Preferably, the step of providing the activation code to the point in the supply chain in response to the point in the supply chain transmitting information relating to the received cryptographic key constitutes registration of the point in the supply chain. Preferably, the information relating to the received cryptographic key and the activation code are transmitted by means of an asymmetric key pair exchange. In that case, the cryptographic key may include a digital cryptographic certificate and the asymmetric key pair may comprise a public key and a private key associated with the digital cryptographic certificate. The point in the supply chain may provide the information relating to the received cryptographic key encrypted using the public key of the asymmetric key pair. This allows the recipient, for example the verification centre, to decrypt the information relating to the received cryptographic key using the private key of the asymmetric key pair. The information relating to the received cryptographic key may be sent together with information identifying the point in the supply chain, for example the production centre. That may also be encrypted using the public key of the asymmetric key pair. Thus, a particular key is linked to a particular production centre or other point in the supply chain. The point in the supply chain may receive the activation code, for example from the verification centre, encrypted by the public key of the asymmetric key pair. This allows the point in the supply chain to decrypt the activation code using the private key of the asymmetric key pair.

The information relating to the cryptographic key is preferably stored in a database accessible to the verification centre. Preferably, the information relating to the cryptographic key is stored together with information identifying the point in the supply chain associated with the key. Preferably, the information identifying the point in the supply chain is stored together with the cryptographic key.

The step of providing the dynamic key for each batch of manufactured items to the verification centre may comprise sending the dynamic key from the point in the supply chain to the verification centre. The dynamic key may be sent via a secure internet connection. Preferably, the dynamic key for a batch of manufactured items is sent together with information about the batch of manufactured items. The dynamic keys are preferably stored in a database accessible to the verification centre. Preferably, each dynamic key is stored together with information about the associated batch of manufactured items.

The dynamic key is simply any piece of information (for example a number) which can be used in combination with other parameters to form a code. In one embodiment, the dynamic key is a secret code which is defined for a particular batch of items. The ID code for each manufactured item may be derived from the cryptographic key in the active state and the dynamic key by any number of mechanisms. In one embodiment, the dynamic key and the cryptographic key are combined to form a pseudorandom noise code which may be used as a digital signature for the ID code. The noise code may be derived additionally from the ID code itself.

In a preferred embodiment, the generated ID codes are not stored. This reduces the possibilities for counterfeiters to access valid ID codes.

The method may be used for tax verification and the method may further comprise reporting to a government authority the number of ID codes marked on the manufactured items; and the verification centre storing information connecting the ID codes marked on the manufactured items to information specific to those manufactured items such that tax paid or owed can be verified against the actual number of items manufactured.

Thus, the count of the codes marked on the manufactured items can be used for tax verification or collection purposes. That is to say, the count of the correct or actual number of manufactured items marked may be used for tax verification or collection purposes. This provides an entirely electronic means for a government authority to assess whether the correct amount of tax has been paid. Of course, the reporting may be to any interested third party although, for tax verification, the third party will usually comprise a government authority. The potential tax collection, based on the number of ID codes reported, can be compared and reconciled with actual tax paid, for example based on actual tax receipts. The verification centre may be managed by a trusted party independent from the manufacturer of the manufactured items. For example, the verification centre may be managed by a government authority. This is particular advantageous for tax verification.

The reporting may be performed per shipment and per excise warehouse such that tax paid or owed can be verified or calculated per shipment and per excise warehouse. This is advantageous because, in many jurisdictions, shipment of products from an excise warehouse is the trigger for tax payment. The reporting may be performed only per shipment. The reporting may be performed only per excise warehouse. The reporting may be performed for any desired unit. The method may further comprise automatically calculating the tax owed per shipment and per excise warehouse. The method may further comprise automatically collecting the tax owed per shipment and per excise warehouse. The method may comprise monitoring payment of the tax owed per shipment and per excise warehouse.

The method may be used for tax verification and the method may further comprise, before the step of generating an ID code for each manufactured item, the step of a government authority authorizing the point in the supply chain to generate a defined number of ID codes.

The authorization may be transmitted from the government authority to the point in the supply chain. Alternatively, the authorization may be transmitted from the government authority to a manufacturing portal in communication with the point in the supply chain. The authorization may be transmitted from the government authority via a secure communication channel. The secure communication channel may be dedicated to the communication between the government authority and that point in the supply chain or manufacturing portal.

Preferably, the defined number of ID codes corresponds to a batch of manufactured items. Preferably, the authorization corresponds to a defined number of manufactured items having common tax constraints.

The method may further comprise, before the step of the government authority authorizing the point in the supply chain to generate a defined number of ID codes, the step of requesting the authorization from the government authority.

The request may be transmitted to the government authority from the point in the supply chain. Alternatively, the request may be transmitted to the government authority from a manufacturing portal in communication with the point in the supply chain. Preferably, the request is transmitted via the secure communication channel. The secure communication channel may be dedicated to the communication between the government authority and that point in the supply chain or manufacturing portal.

The method may further comprise reporting to the government authority the number of ID codes marked on the manufactured items.

The reporting may be performed by the point in the supply chain. Alternatively, the reporting may be performed by a manufacturing portal in communication with the point in the supply chain. This step allows the government authority to verify that the actual number of ID codes marked on the manufactured items complies with the defined number of ID codes authorized by the government authority. The reporting may be to any interested third party although, for tax verification, the third party will usually comprise a government authority. The verification centre may store information connecting the ID codes marked on the manufactured items to information specific to those manufactured items, such that tax paid or owed can be verified against the actual or correct number of items manufactured. Thus, the count of the ID codes marked on the manufactured items can be used for tax verification or collection purposes. This provides an entirely electronic means for a government authority to assess whether the correct amount of tax has been paid. The point in the supply chain may also report to the government authority the tax rate for each manufactured item. If the defined number of ID codes corresponds to a batch of manufactured items, preferably each manufactured item in the batch of manufactured items is associated with a single tax rate.

The method may further comprise a user transmitting the ID code marked on a selected manufactured item to the verification centre; the verification centre deriving, from the ID code, tax information relating to the selected manufactured item; and the verification centre transmitting at least some of the tax information relating to the selected manufactured item to the user. The user may comprise a government authority or other official body.

Using the method of the invention for tax verification provides a number of advantages. Prior art methods and systems typically use tax stamps or fiscal stickers for tax verification. Both are usually in the form of adhesive labels directly attached to consumer packaging on manufactured items. The adhesive label typically includes visible and invisible security features. Tax stamps are used for tax collection and verification of tax-paid status. Usually, tax stamps carry the actual excise value due on the specific item on which the tax stamp is applied. Fiscal stickers are also used for tax collection and verification of tax-paid status, but this is usually through verification of production volume. Generally, the number of fiscal stickers sold or sent to a manufacturer will need to correspond to the actual or correct number of manufactured items sold or distributed for sale. Usually, fiscal stickers do not carry a particular excise value but the manufacturer will need to pay a price per fiscal sticker issued.

Although there is a widespread belief that fiscal stickers and tax stamps still provide a secure and effective means to protect excise revenues, recent developments have shown that even the most sophisticated paper stamps have been successfully counterfeited. Such counterfeiting will only increase as counterfeiting technology and know-how increases. En addition, valid stamps may be diverted, for example from one authorized manufacturing centre to another unauthorized manufacturing centre. Thus, the unauthorized manufacturing site appears to be authorized because the tax stamps are valid.

Using the method of the invention for tax verification provides a number of advantages. Firstly, there is no need for distribution of physical markers (for example, adhesive labels), which could easily be intercepted. This also results in a lower environmental impact. Secondly, preferably the ID codes are not stored, which reduces the possibilities for counterfeiters to access valid ID codes. The method is extremely secure to forgery and tampering of valid codes and to theft of codes. This also prevents counterfeiters from hacking into the valid ID code database and inserting unauthorized codes, thus making it impossible to distinguish between valid and invalid codes. Thirdly, compared with other tax verification technology, the method of the invention is inexpensive to implement, which allows it to be more widely used than existing systems, particularly for small and medium-sized manufacturers. Further, many manufacturers already use a system of ID codes for identifying manufactured items. Such a system can easily be adapted to be used with the method of the invention for tax verification purposes. Finally, if desired, users, government authorities or other parties can easily access tax information about a particular manufactured item in real time. No specialized systems or training are required and any interested party, for example importers, point-of-sale entities and other members of the supply chain, can access tax information.

The verification centre may be managed by a trusted party independent from the manufacturer of the manufactured items. For example, the verification centre may be managed by a government authority. This is particular advantageous for tax verification.

The method may be used for production volume verification and the method may further comprise reporting to a third party the number of ID codes marked on the manufactured items.

Production volume verification is the verification of the actual volumes produced, for example the actual number of items manufactured. The reporting may be performed by the point in the supply chain. Alternatively, the reporting may be performed by a manufacturing portal in communication with the point in the supply chain. Preferably, the reporting comprises securely reporting, for example over a secure network connection. Preferably, the verification centre stores information connecting the ID codes marked on the manufactured items to information specific to those manufactured items. Thus, ID codes marked on the manufactured items can be linked to information specific to the actual or correct number of manufactured items marked. The number of ID codes marked on the manufactured items may be reported per tax level, per unit of time, or per Stock Keeping Unit (SKU).

This allows the third party to verify the number of manufactured items produced and distributed. The reporting may take place at regular time periods. The reporting does not need to take place immediately after the manufactured items are marked. The third party may be a government authority or another party having interest in the number of items manufactured, for example manufactured at a particular production centre. The reporting may comprise sending the ID codes marked on the manufactured items to the third party.

The reporting may be performed per shipment and per excise warehouse such that production volumes can be verified or calculated per shipment and per excise warehouse. This is advantageous because, in many jurisdictions, shipment of products from an excise warehouse is the trigger for tax payment, so the volume of products exiting a particular warehouse is critical.

Using the method of the invention for production volume verification provides a number of advantages. For example, many manufacturers already use a system of ID codes for identifying manufactured items. Such a system can easily be adapted to be used with the method of the invention for production volume verification purposes. In addition, production volumes can be reported to the third party, for example a government authority, regularly and in real time.

The verification centre may be managed by a trusted party independent from the manufacturer of the manufactured items. For example, the verification centre may be managed by a government authority. This is particular advantageous for production volume verification.

The method may be used for authenticating a selected manufactured item and the method may further comprise: a user transmitting the ID code marked on the selected manufactured item to the verification centre; the verification centre deriving from the ID code, the cryptographic key and the dynamic key used to generate the ID code; the verification centre deriving from the cryptographic key and the dynamic key information relating to the selected manufactured item; and the verification centre transmitting at least some of the information relating to the selected manufactured item to the user.

This allows a user to verify that the selected manufactured item is genuine. This also allows the user to obtain selected information about the manufactured item. The information may include information regarding the production centre or manufacturing site of the manufactured item, information regarding the code generator which generated the ID code on the manufactured item, information about time (for example, date, hour, minute) of production and other information which may be associated with the ID code. The user may comprise a government authority or other official body, an importer, point-of-sale entity or member of the supply chain, an end-consumer, or any other interested party.

Preferably, the cryptographic key is stored in a database accessible to the verification centre. Preferably, the cryptographic key is stored together with information identifying the point in the supply chain, for example the production centre. In that case, the step of the verification centre deriving from the cryptographic key information relating to the selected manufactured item may comprise the verification centre accessing the database and obtaining information identifying the point in the supply chain associated with the cryptographic key.

Preferably, the dynamic key is stored in a database accessible to the verification centre. Preferably, the dynamic key is stored together with information about the associated batch of manufactured items. In that case, the step of the verification centre deriving from the dynamic key information relating to the selected manufactured item may comprise the verification centre accessing the database and obtaining information about the batch of manufactured items associated with the dynamic key. If the dynamic key and the cryptographic key are combined to form a pseudorandom noise code used as a digital signature for the ID code, the unsigned ID code may be derived from the digitally signed ID code. Then, the verification centre can determine the dynamic key and the cryptographic key from the database and independently derive the noise code for comparison with the received digitally signed ID code.

The ID code transmitted from the user to the verification centre may be transmitted via a secure or non-secure internet connection. The information transmitted from the verification centre to the user may be transmitted via a secure or non-secure internet connection.

The verification centre may be managed by a trusted party independent from the manufacturer of the manufactured items. For example, the verification centre may be managed by a government authority.

According to the invention, there is also provided apparatus for marking manufactured items, comprising: a key generator for generating a cryptographic key, the cryptographic key having an active state and an inactive state; at least one point in a supply chain for the manufactured items, the key generator being arranged to send the cryptographic key, in the inactive state, to the point in the supply chain, wherein the point in the supply chain is arranged to receive, in response to the point in the supply chain transmitting information relating to the received cryptographic key, an activation code for activating the cryptographic key, the activation code allowing the cryptographic key in the inactive state to be activated to form the cryptographic key in the active state; a verification centre for verifying properties of the manufactured items, the key generator being arranged to provide the cryptographic key in the active state and the activation code to the verification centre; a code generator, at the point in the supply chain, for generating an identification (ID) code for each manufactured item, the ID code being derived from the cryptographic key in the active state and a dynamic key generated for each batch of manufactured items, wherein the dynamic key for each batch of manufactured items is provided to the verification centre; a marker at the point in the supply chain for marking each manufactured item with the ED code; and a counter for counting the number of ID codes marked on the manufactured items.

The apparatus is an apparatus for marking manufactured items, which may be used for tax verification (for manufactured items which are subject to taxation), for production volume verification and for authenticating manufactured items. The correct or actual number of manufactured items marked is counted. One ID code is marked on each manufactured item, such that each manufactured item can be uniquely identified.

The apparatus may further comprise a database accessible to or forming part of the verification centre. The cryptographic key may be stored in the database. The cryptographic key may be stored in the database together with information identifying the point in the supply chain associated with the key. The dynamic key may be stored in the database. Each dynamic key may be stored in the database together with information about the associated batch of manufactured items. The key generator may form part of the verification centre.

Features described in relation to the method of the invention may also be applicable to the apparatus of the invention.

According to the invention, there is also provided a method of marking manufactured items, the method used for tax verification and comprising: generating a plurality of identification (ID) codes for the manufactured items; marking each manufactured item with an ID code of the plurality of ID codes; counting the actual number of ID codes of the plurality of ID codes marked on the manufactured items, wherein the actual number of ID codes is the same as or less than the plurality of ID codes; reporting to a government authority the actual number of ID codes marked on the manufactured items; and storing information connecting the ID codes marked on the manufactured items to information specific to those manufactured items, such that tax paid or owed can be verified against the actual number of items marked.

The ID codes may be generated and marked onto the items at any point in the supply chain for the manufactured items, for example at an importation point, a distribution point, a purchaser, a wholesaler or any other link in the supply chain. Most preferably, however, the point in the supply chain at which the ID codes are generated and marked onto the manufactured items comprises a production centre or production line for the manufactured items.

The method may further comprise, before the step of generating a plurality of ID codes for the manufactured items: requesting authorization from a government authority to generate ID codes for the manufactured items; and receiving authorization from the government authority to generate a defined number of ID codes for the manufactured items.

The step of requesting authorization from a government authority may comprise transmitting a request to the government authority via a secure communication channel. The request may be transmitted from any point in the supply chain, for example a production centre. Alternatively, the request may be transmitted from a manufacturing portal in communication with the point in the supply chain. The secure communication channel may be dedicated to the communication between the government authority and that point in the supply chain or manufacturing portal.

The step of receiving authorization from the government authority may comprise receiving the authorization from the government authority via a secure communication channel. The authorization may be transmitted to any point in the supply chain. Alternatively, the authorization may be transmitted to a manufacturing portal in communication with the point in the supply chain. The secure communication channel may be dedicated to the communication between the government authority and that point in the supply chain or manufacturing portal. Preferably, the defined number of ID codes corresponds to a batch of manufactured items.

The step of reporting to the government authority the number of ID codes marked on the manufactured items may comprise reporting to the government authority via a secure communication channel. The reporting may be performed by any point in a supply chain for the manufactured items. Alternatively, the reporting may be performed by a manufacturing portal in communication with a point in the supply chain. The secure communication channel may be dedicated to the communication between the government authority and that point in the supply chain or manufacturing portal. This step allows the government authority to verify the number of ID codes marked on the manufactured items. Information connecting the ID codes marked on the manufactured items to information specific to those manufactured items may be stored, such that tax paid or owed can be verified against the actual or correct number of items manufactured. Thus, the count of the ID codes marked on the manufactured items can be used for tax verification or collection purposes. This provides an entirely electronic means for a government authority to assess whether the correct amount of tax has been paid. The tax rate for each manufactured item may also be reported to the government authority. If the actual number of ID codes corresponds to a batch of manufactured items, preferably each manufactured item in the batch of manufactured items is associated with a single tax rate.

The method may further comprise a user transmitting the ID code marked on a selected manufactured item to a verification centre; the verification centre deriving from the code, tax information relating to the selected manufactured item; and the verification centre transmitting at least some of the tax information relating to the selected manufactured item to the user. The user may comprise a government authority or other official body. The verification centre may be managed by a trusted third party independent from the manufacturer of the manufactured items. For example, the verification centre may be managed by a government authority.

The method of this aspect of invention provides a number of advantages. As already discussed, prior art methods and systems typically use tax stamps or fiscal stickers for tax verification. Although there is a widespread belief that fiscal stickers and tax stamps still provide a secure and effective means to protect excise revenues, recent developments have shown that even the most sophisticated paper stamps have been successfully counterfeited. Such counterfeiting will only increase as counterfeiting technology and know how increases. In addition, valid stamps may be diverted, for example from one authorized manufacturing centre to another unauthorized manufacturing centre.

The method of this aspect of the invention provides a number of advantages. Firstly, there is no need for distribution of physical markers (for example, adhesive labels), which could easily be intercepted. This also results in a lower environmental impact. Secondly, preferably the ID codes are not stored, which reduces the possibilities for counterfeiters to access valid ID codes. The method is extremely secure to forgery and tampering of valid codes and to theft of codes. Thirdly, compared with other tax verification technology, the method of the invention is inexpensive to implement, which allows it to be more widely used than existing systems, particularly for small and medium-sized manufacturers. Further, many manufacturers already use a system of ID codes for identifying manufactured items. Such a system can easily be adapted to be used with the method of the invention for tax verification purposes. Finally, if desired, users, government authorities or other parties can easily access tax information about a particular manufactured item in real time. No specialized systems or training is required and any interested party, for example importers, point-of-sale entities and other members of the supply chain, can access tax information.

In one particular embodiment, the step of generating the plurality of ID codes for the manufactured items comprises generating the ID codes from a cryptographic key in an active state and at least one dynamic key, each dynamic key being associated with a batch of manufactured items. The cryptographic key may be generated in a key generator. The cryptographic key in the active state may be provided to the verification centre, together with an activation code for activating the cryptographic key in an inactive state to form the cryptographic key in the active state. The cryptographic key in the inactive state may be provided to the code generator. The verification centre may provide the activation code to the code generator in response to the code generator transmitting information relating to the received cryptographic key, thereby registering the code generator for code generation. The cryptographic keys may be stored in a database. The dynamic keys may be stored in a database. Preferably, the ID codes are not stored.

Features of one aspect of the invention may be applicable to another aspect of the invention. Moreover, features described in relation to tax verification may be applicable to production volume verification and to authentication, features described in relation to production volume verification may be applicable to tax verification and to authentication, and features described in relation to authentication may be applicable to tax verification and to production volume verification.

BRIEF DESCRIPTION OF THE DRAWINGS

Embodiments of the invention will now be described, by way of example only, with reference to the accompanying drawings, of which.

DETAILED DESCRIPTION OF THE INVENTION

Figure 1:
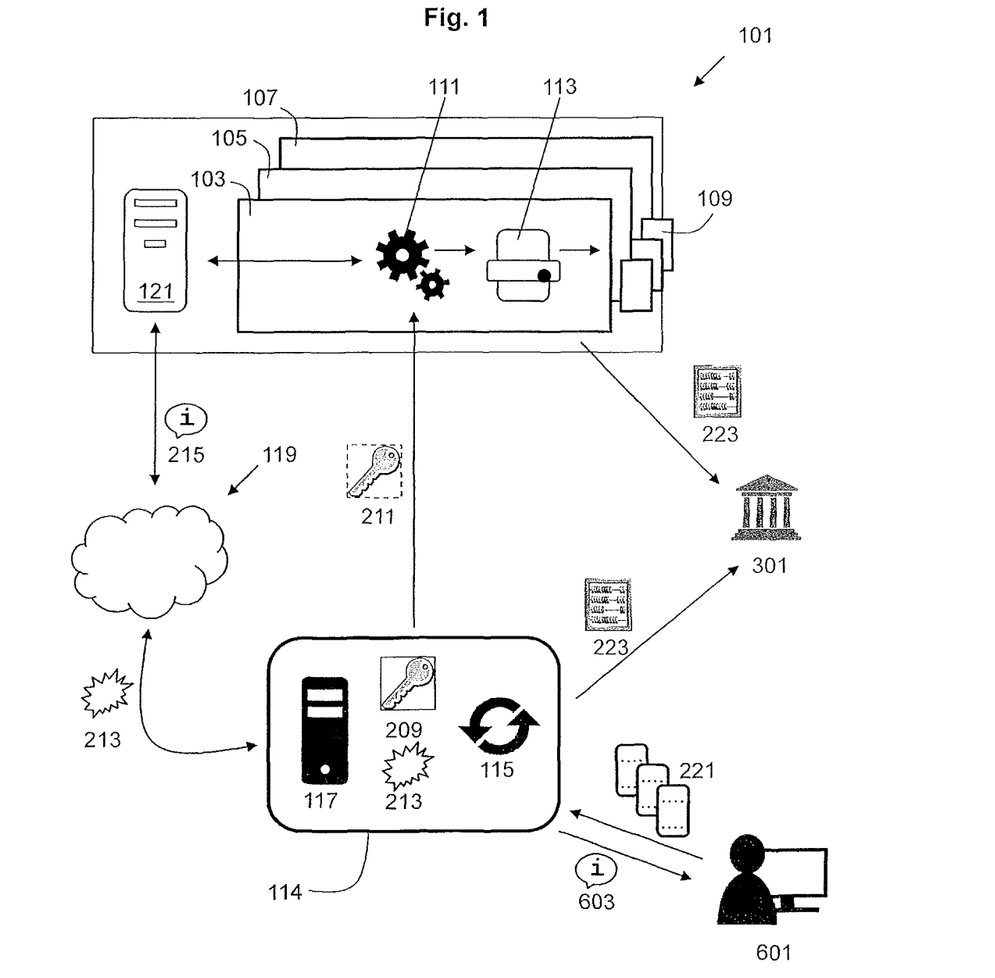
FIG. 1 is a schematic view of a marking system according to one embodiment of the invention.

FIG. 1 is a schematic view of a marking system according to one embodiment of the invention. In this embodiment, system 101 comprises one or more production centres 103, 105, 107 for producing manufactured items 109. Each production centre may comprise a production line or facility which may be a cigarette making and packaging line. Preferably, production is carried out in batches, each hatch being dedicated to the production of a certain number of individual manufactured items. If there are two or more production centres, these may be physically located at the same or different manufacturing sites. In this preferred embodiment, the system includes production centres 103, 105, 107, but the invention may in fact be performed at an importation point, a distribution point, a purchaser, a wholesaler or any other point in the supply chain.

Each production centre includes a code generator 111 for generating codes for the manufactured items 109. Preferably, the code generator 111 is a fully autonomous computer or microcontroller dedicated to a particular production centre. In this embodiment, each production centre also includes a marker 113 for marking the generated codes onto the manufactured items 109. The marker 113 may comprise any suitable marking means, for example but not limited to, a continuous ink jet printer, a drop-on-demand ink jet printer, a holographic printer, a laser printer, or any other printer or marker that allows printing or marking of the generated codes on the individual manufactured items. The printing or marking of the generated codes may be on each item, on an external package, on labels or in any other convenient way. In one embodiment, the generated codes are printed on adhesive tags or labels to be applied to the manufactured items, preferably non-removably. In one embodiment, the generated codes are printed by a laser beam on a layer of laser-sensitive material deposited on the manufactured item or on the item's packaging. This method allows a code to be impressed through a transparent wrapping layer.

The system 101 further comprises a verification centre 114 which includes a key generator 115 for generating keys 209, 211 for use in the marking and authenticating of the manufactured items and a central server 117. In this embodiment, the code generator 111 can communicate with the verification centre 114 via a secure internet connection 119 and a server 121 local to the production centre, or by other data communication means. Alternatively, the code generator 111 might communicate with the verification centre via a manufacturing portal dedicated to one or more production centres.

Figure 2:
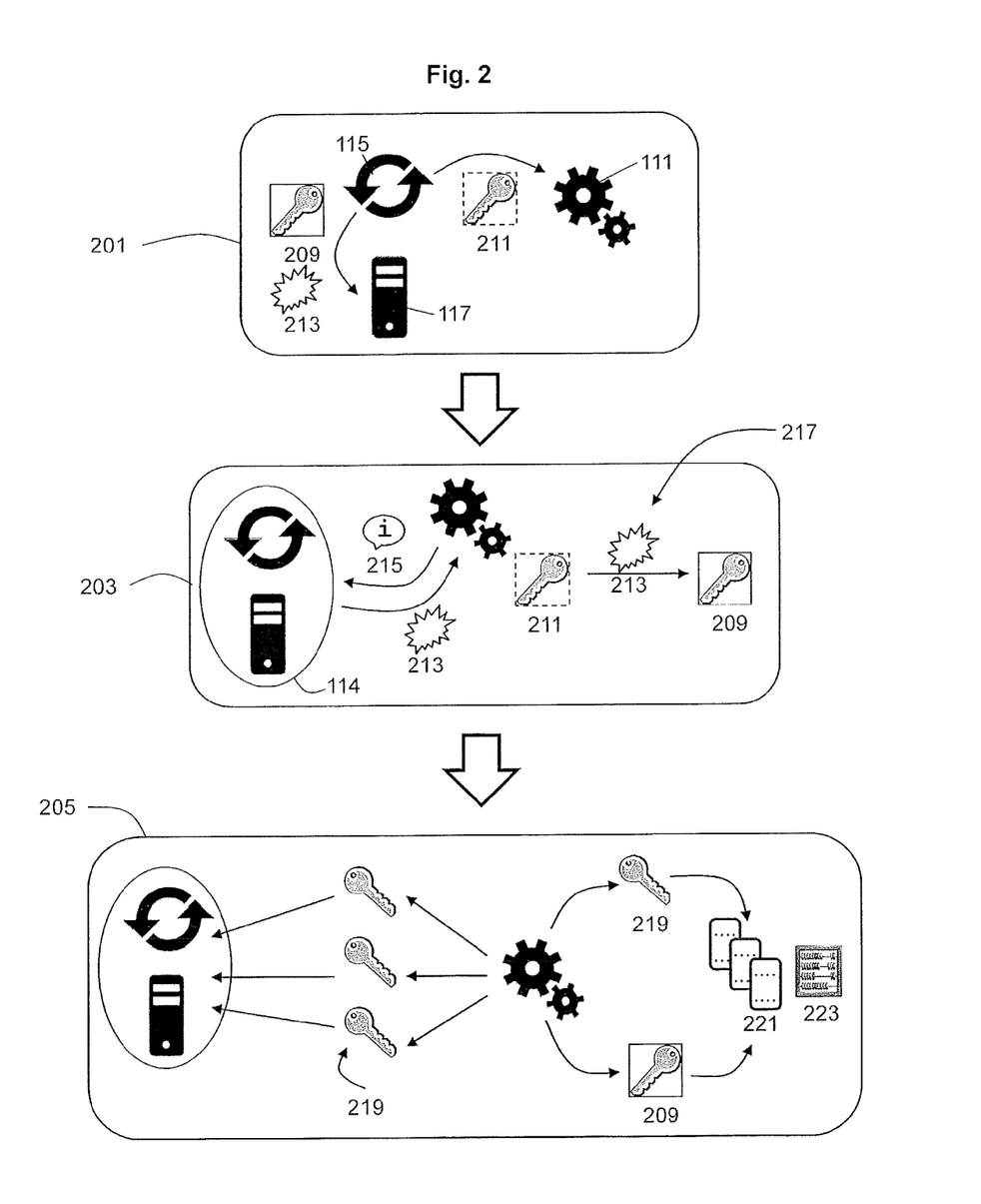
FIG. 2 is a flow chart showing three steps of the method of one embodiment of the invention which may be carried out on the system of FIG. 1.

FIG. 2 is a flow chart showing three steps of the method of one embodiment of the invention which may be performed on the system 101 of FIG. 1. Referring to FIGS. 1 and 2, in first step 201 of the method, the key generator 115 generates a cryptographic key in the form of a machine key. The key generator 115 generates an unencrypted version of the machine key and an encrypted version of the machine key. The unencrypted version of the machine key, known as the active machine key 209, is shown with a solid border in FIGS. 1 and 2. The encrypted version of the machine key, known as the inactive machine key 211, is shown with a dotted border in FIGS. 1 and 2. The active machine key 209, that is to say the unencrypted version of the machine key, is generated in the key generator 115 and is therefore accessible to the central server 117. This is shown in both FIGS. 1 and 2. The key generator 115 sends the inactive machine key 211 to the code generator 111 at the production centre 103, 105, 107. This is shown in both FIGS. 1 and 2.

The inactive machine key 211 may be sent from the key generator 115 to the code generator 111 on a non-volatile data support, for example a CD-Rom, a DVD-Rom or a removable hard disk. The data support is physically transferred to the code generator ill at the production centre 103, 105, 107. Alternatively, the inactive machine key 211 may be sent from the key generator 115 to the code generator 111 via a secure network connection, for example one involving encryption. This may be on request from the code generator 111. This ensures authenticity, confidentiality and integrity of the machine key.

The key generator 115 also generates the activation code 213, which comprises the key or code for decrypting the inactive machine key 211 to form the active machine key 209. This activation code 213 is also accessible to the central server 117 and this is also shown in FIGS. 1 and 2. Preferably, the active machine key 209 and activation code 213 are stored together with identification of the production centre 103, 105, 107 to which they are allocated.

In one embodiment, the machine key comprises a number of portions. The primary portion may be a plurality of secret codes, for example a salt matrix. A salt matrix may be, for example, a long string of random or pseudorandom digits of characters. The number of portions may further include a unique identifier for the machine key, a serialized code defining how the machine key is to be combined with a dynamic key (discussed below), a digital cryptographic certificate associated the machine key's unique identifier and a machine key policy or license that contains the digital cryptographic certificate generated above.

Preferably, the inactive machine key, that is to say the encrypted version of the machine key, and particularly the plurality of secret codes, is encrypted using a strong cipher. An example of a suitable cipher is the Triple DES (Data Encryption Standard) block cipher or the Triple DES/Rijandel block cipher. Both apply the Data Encryption Standard cipher algorithm three times to each data block and the Triple DES/Rijandel is a minor variation of the Triple DES which has been developed by IBM. In that case, the Triple DES or Triple Des/Rijandel key comprises the activation code 213. Thus, in a preferred embodiment, the active machine key 209 is unencrypted, the inactive key 211 is encrypted using the Triple DES or Triple Des/Rijandel key, and the activation code 213 comprises that Triple DES or Triple Des/Rijandel key.

At next step 203, the inactive machine key 211 received by the code generator 111 is registered. This is done by the code generator 111 sending to the verification centre 114 information 215 about the received machine key and any relevant machine information (not shown). This is preferably sent via secure internet connection 119, as shown in FIG. 1, but may be sent by another suitable route. The verification centre 114 sends back to the code generator 111 the activation code 213. The activation code 213 allows the inactive machine key 211 to be activated, and this is shown schematically at 217. The activation code 213 is preferably also sent via secure internet connection 119, as shown in FIG. 1. The registration procedure is preferably arranged such that the active machine key 209 is never transferred over the internet.

The registration procedure may take the form of a conventional public/private key pair exchange mechanism. This may use an asymmetric key pair associated with the digital cryptographic certificate forming part of the machine key, as discussed above. In that case, the public key of the asymmetric key pair may be in the form of a key issued by a third party, for example, a government authority. The information 215 about the received machine key which is sent from the code generator 111 to the verification centre 114 may comprise the unique identifier for the machine key which forms part of the machine key, as discussed above. The relevant machine information (not shown) which is also sent from the code generator 111 to the verification centre 114 may comprise a unique identifier or certificate for the code generator 111 or production centre. That unique identifier may include information about the location and identity of the code generator or production centre, which has been pre-authorized for production. Preferably, the machine key unique identifier and the code generator or production centre identifier are encrypted using the public key of the asymmetric key pair associated with the certificate of the machine key.

Once the verification centre 114 receives the encrypted machine key unique identifier and the code generator or production centre identifier, the verification centre 114 can decrypt using the private key of the asymmetric key pair associated with the certificate of the machine key. The verification centre may then check that the machine key unique identifier and the code generator or production centre identifier are valid. Then, the verification centre 114 sends back to the code generator 111 the activation code 213. As already mentioned, preferably, the activation code 213 is in the form of a Triple DES or Triple DES/Rijandel cipher. The verification centre encrypts the activation code (for example the Triple DES or Triple DES/Rijandel cipher) with the public key of the asymmetric key pair associated with the certificate of the machine key. This allows the activation code (for example the Triple DES or Triple DES/Rijandel cipher) to be decrypted by the code generator using the private key of the asymmetric key pair associated with the certificate of the machine key. Then, the inactive machine key 211 can be activated using the decrypted activation code 213 in order to form the active machine key 209.

Once the inactive machine key 211 at the code generator 111 has been activated, the production centre is able to manufacture items and produce codes for the manufactured items at the code generator 111. As shown at next step 205, the code generator 111 generates a dynamic key 219 per batch of manufactured items. The dynamic key 219 is preferably a random dynamic secret code. The code generator uses the dynamic key 219 for a batch, together with the active machine key 209, to generate codes 221 (for example alpha-numeric codes) for the manufactured items in that batch. As mentioned previously, the particular mechanism to combine the dynamic key 219 for a batch with the active machine key 209 is defined in the serialized code which forms part of the machine key. The codes 221 may be marked onto the items by marker 113. Only one code is marked onto each manufactured item 109. The code generator 111 or production centre 103, 105, 107 keeps a count 223 of the codes which are marked onto the manufactured items.

In addition, the code generator 111 sends the dynamic key 219 for each batch, together with information about the batch (not shown), to the verification centre 114. This may be performed via secure internet connection 119. The information about the batch may include various information, for example but not limited to brand, intended market or intended destination. The dynamic keys 219 do not need to be sent to the verification centre 114 in real-time and can be communicated to the verification centre at any appropriate time, for example monthly. The dynamic keys 219 sent to the verification centre 114 are stored in a database (for example at central server 117) at or accessible from the verification centre 114. The dynamic key 219 for each batch is preferably stored together with the batch information sent to the verification centre 114 at the same time.

As already discussed, the particular mechanism to combine the dynamic key 219 for a hatch with the active machine key 209 is defined in the serialized code which forms part of the machine key. In one embodiment, the dynamic key 219 and active machine key 209 are combined by the code generator to form a pseudorandom noise code which is safe from cryptographic attacks. The noise code does not allow reconstruction of the dynamic key 219 and active machine key 209 from the noise code. A variety of known techniques are available for generating the noise code, including, but not limited to, table substitution, indexing, hashing, and variations thereof. The noise code is preferably used as a digital signature for the ID code. The noise code may be derived from the ID code itself. The dynamic key 219 and the active machine key 209 are known only to the verification centre 114 and the code generator 111.

Preferably, the active machine key 209 is deleted when the code generator 111 at a particular production centre 103,

105, 107 is put out of service. This prevents a malicious user from gaining access to the active machine key 209 without proper registration. Additional means for disabling the code generator 111 and preventing unauthorized use of the code generator 111 and production centre may be provided.

Figure 3:
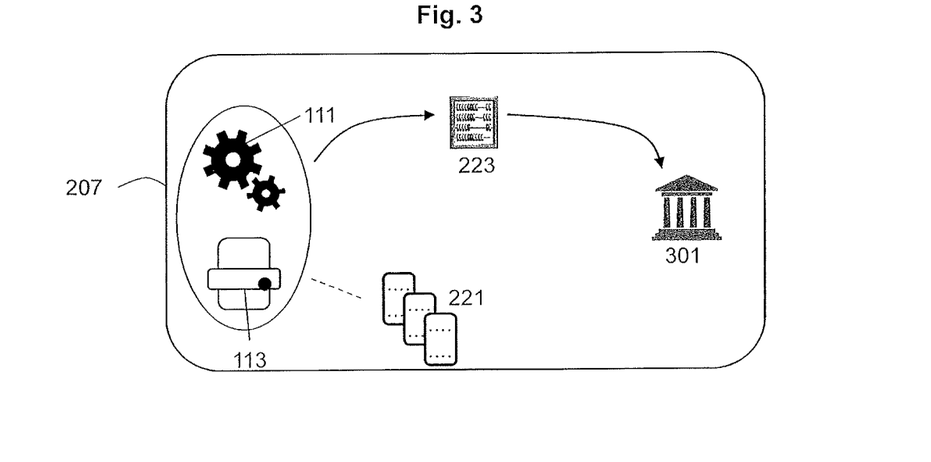
FIG. 3 shows a further step of the method of FIG. 2 when the system of FIG. 1 is used for a first embodiment of tax verification.

FIG. 3 shows a further step 207 of the method of FIG. 2 when the system of FIG. 1 is used for a first embodiment of tax verification. In this case, the steps of the method are carried out in the order 201, 203, 205, 207. Production volumes, for example the number of items produced in each production batch by each production centre, as well as statistical production data per brand or per intended market, may be gathered and stored. Such production volume information may be used to verify tax collection. The system may be used instead of, or in addition to, a conventional system of tax stamps or fiscal stickers to enable verification of tax-paid status, to protect excise revenues and to prevent counterfeiting of tax stamps or fiscal stickers.

At the third step 205 of the method of FIG. 2, the code generator 111 or production centre 103, 105, 107 keeps a count 223 of the codes which are marked onto the manufactured items during the production process. The counting may be done by the code generator 111 and marker 113 at each production centre or at another appropriate location. If the production centre includes a sensor for detecting the marked ID codes on manufactured items, the sensor may perform the counting. This produces the exact number of codes 221 which were printed or marked and this count 223 can be reported to a third party, for example a government authority 301. This is shown in FIGS. 1 and 3.

The tax rate for each manufactured item may be sent to the government authority 301, or other relevant party, together with the count 223. Taxes owed may then be computed by multiplying all printed codes associated with a specific tax rate by the tax rate itself. This enables a government authority to verify or compute the taxes owed or the taxes already paid. The system can be used with different tax rates if desired, in which case the rates may be input as part of the batch information before production of a batch of items. Preferably, the verification centre 114 stores information connecting the ID codes marked on the actual or correct number of manufactured items to information specific to those marked manufactured items. Then the tax paid or owed can be verified against items manufactured. The verification centre 114 may be managed by a trusted third party, for example the government authority itself.

The production volume information which is reported to the government authority 301 may be reported per shipment or per excise warehouse or per shipment and per excise warehouse. The production volume information can be reported by categories such as volume per SKU (stock keeping unit), volume per retail price, volume per domestic production, volume per export production, volume per duty free. The production volume information can be reported periodically, for example each month or at another appropriate time.

In some cases, the government authority 301 or other party, may submit a request to the verification centre 114 to obtain production information, such as production volume. In that case, the verification centre 114 may be maintained by a trusted third party independent from the producer of the manufactured items. The verification centre 114, in response to such a request, can then obtain the data from the relevant production centres 103, 105, 107. This may enable government authorities to verify the production volumes declared.

One of the advantages of the embodiment of FIG. 3 is that no preliminary authorization is required for each batch of manufactured items. As long as the production centre or particular code generator is registered with the government authority, the code generator can simply produce as many codes as required. Then, the actual or correct number of codes used can be reported once the items have been manufactured and marked.

Figure 4:
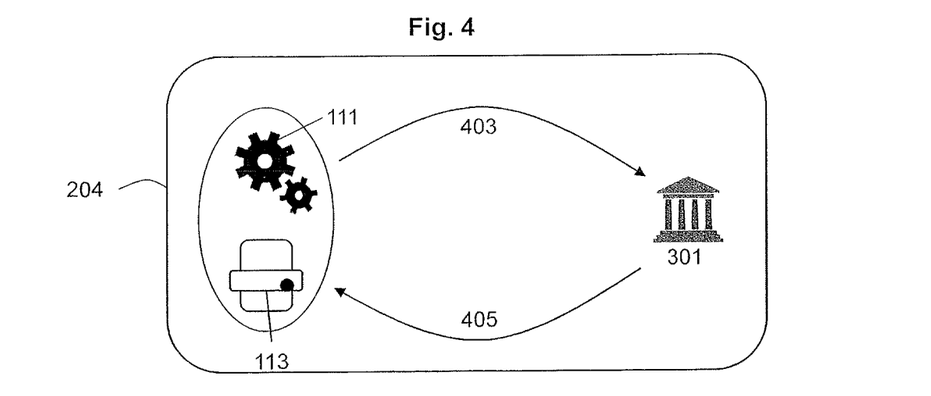
FIG. 4 shows a further step of the method of FIG. 2 when the system of FIG. 1 is used for a second embodiment of tax verification.

FIG. 4 shows a further step 204 of the method of FIG. 2 when the system of FIG. 1 is used for a second embodiment of tax verification. In this case, the step 204 shown in FIG. 4 is carried out before step 205, either after or in parallel with steps 201 and 203. The system may be used instead of, or in addition to, a conventional system of tax stamps or fiscal stickers to enable verification of tax-paid status, to protect excise revenues and to prevent counterfeiting of tax stamps or fiscal stickers.

At step 204, the code generator 111 and marker 113 at each production centre request authorization from a government authority 301 to generate a defined number of ID codes. This is shown schematically at 403. Alternatively, the request may be sent from a manufacturing portal dedicated to one or more production centres. In response, the government authority 301 authorizes the production centre to generate a defined number of ID codes. This is shown schematically at 405.

Preferably, the request 403 triggers payment for the quantity of ID codes ordered. The authorization may therefore indicate a tax-paid status. The production centre is only eligible to manufacture items and produce codes for the manufactured items at the code generator 111 once authorization is received. A request may be sent for each production batch of manufactured items. Preferably, all manufactured items in the batch have the same associated tax rate.

The step of FIG. 4 may be combined with reporting to the government authority the actual or correct number of ID codes marked on the manufactured items, as described in relation to FIG. 3. This may provide confirmation of the production volume.

Figure 5:
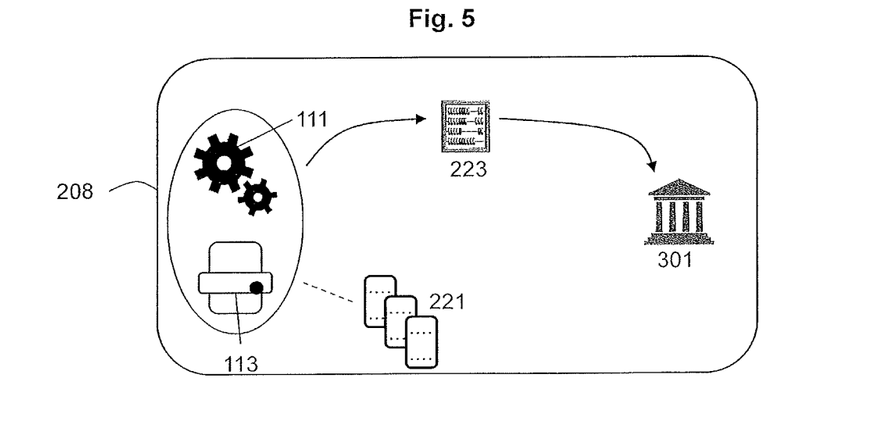
FIG. 5 shows a further step of the method of FIG. 2 when the system of FIG. 1 is used to verify a production volume.

FIG. 5 shows a further step 208 of the method of FIG. 2 when the system of FIG. 1 is used to verify a production volume. In this case, the steps of the method are carried out in the order 201, 203, 205, 208. Production volumes, for example the number of items produced in each production batch by each production centre, as well as statistical production data per brand or per intended market, may be gathered and stored. Such production volume information may be used for production management, or for official purposes, and may be available to selected users.

At the third step 205 of the method of FIG. 2, the code generator 111 or production centre 103, 105, 107 keeps a count 223 of the codes which are marked onto the manufactured items during the production process. The counting may be done by the code generator ill and marker 113 at each production centre or at another appropriate location. If the production centre includes a sensor for detecting the marked ID codes on manufactured items, the sensor may perform the counting. This produces the exact number of codes 221 which were printed or marked. As shown in FIG. 5, the fourth step 208 of the method for production volume verification is to report the count 223 to an interested party, for example a government authority 301. This is shown in FIGS. 1 and 5.

Preferably, the verification centre 114 stores information connecting the ID codes marked on the manufactured items to information specific to those marked manufactured items. In some cases, the government authority 301 or other party, may submit a request to the verification centre 114 to obtain production information, such as production volume. In that case, the verification centre 114 may be maintained by a trusted third party independent from the producer of the manufactured items. The verification centre 114, in response to such a request, can then obtain the data from the relevant production centres 103, 105, 107. This may enable government authorities to verify the production volumes declared.

The production volume information which is reported to the government authority 301 may be reported per shipment or per excise warehouse or per shipment and per excise warehouse. The production volume information can be reported by categories such as volume per SKU (stock keeping unit), volume per retail price, volume per domestic production, volume per export production, volume per duty free production (if the manufactured items are subject to special taxes). The production volume information can be reported periodically, for example each month or at another appropriate time.

Figure 6:
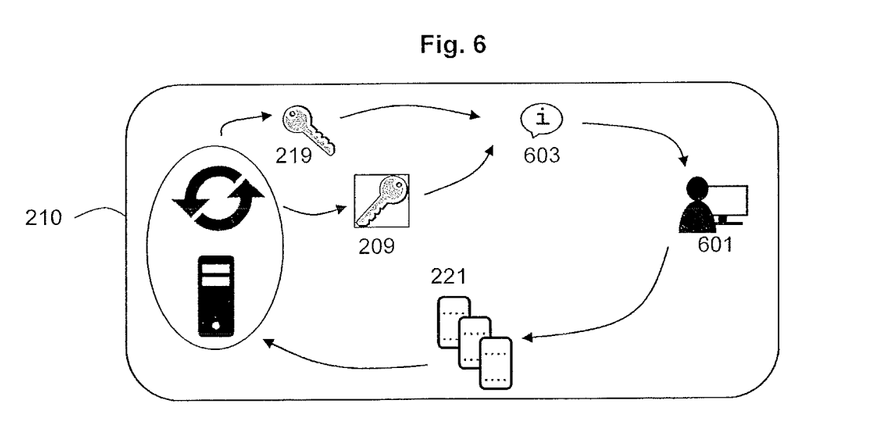
FIG. 6 shows a further step of the method of FIG. 2 when the system of FIG. 1 is used for authenticating a manufactured item.

FIG. 6 shows a further step 210 of the method of FIG. 2 when the system of FIG. 1 is used for authenticating a manufactured item. In this case, the steps of the method are carried out in the order: 201, 203, 205, 210. At step 210, when a user 601 wishes to authenticate an individual manufactured item, the user sends the code 221 on the item to verification centre 114. This is shown in FIGS. 1 and 6. The user 601 may send the code to the verification centre 114 by any suitable means such as a secure or non-secure internet connection. From the code 221, the verification centre 114 can derive the dynamic key 219 and the active machine key 209 used to generate the code 221. This is done by a reverse of the process used to generate the code 221 at step 205.

For example, if the dynamic key 219 and active machine key 209 are combined to form a pseudorandom noise code which is used as a digital signature for the ID code, the verification centre can derive the unsigned ID code from the digitally signed ID code. Then, the verification centre 114 can independently derive the dynamic key 219 and active machine key 209 from information relating to the ID code and check this against the received noise code.

From the derived active machine key 209, the production centre 103, 105, 107 at which the item was manufactured can be determined, since the active machine keys are preferably stored in the database together with details of their associated production centres. From the derived dynamic key 219, the batch information for the item can be determined since the dynamic keys are preferably stored in the database together with the associated batch information. Thus, the verification centre 114 can derive, from the code 221 sent from user 601, various information 603 about the individual item. This is shown schematically in FIG. 6. The verification centre may also undertake checks that the various parameters (for example, the active machine key, the dynamic key, the batch information) have valid values. Then all, or selected portions of, the information 603 can be sent to the user 601. This is shown in FIGS. 1 and 6. The information 603 is preferably sent to the user 601 via the same means as the original code was sent.

A privileged user, for example an employee of the manufacturer or of a government authority may receive additional privileged information not available to a generic user. Such privileged information may include production volume information, statistical information related to the production centre or to verification centre access, the expiry date, warranty information, importation routes and so on.

The embodiments described provide an improved method and system for marking manufactured items, which may be used for tax verification as shown in FIGS. 3 and 4, for production volume verification as shown in FIG. 5 and for authenticating manufactured items as shown in FIG. 6.

The invention claimed is:

1. A method of marking manufactured items, comprising:
providing a cryptographic key in an inactive state to a point in a supply chain for the manufactured items;
providing the cryptographic key in an active state and an activation code for activating the cryptographic key in the inactive state to form the cryptographic key in the active state, to a verification centre;
transmitting information relating to the received cryptographic key from the point in the supply chain to the verification centre;
providing the activation code to the point in the supply chain in response to the point in the supply chain transmitting information relating to the received cryptographic key, the activation code allowing the cryptographic key in the inactive state at the point in the supply chain to be activated to form the cryptographic key in the active state;
wherein the step of providing the activation code to the point in the supply chain comprises sending the activation code from the verification centre to the point in the supply chain;
generating, at the point in the supply chain, an identification (ID) code for each manufactured item, the ID code being derived from the combination of the cryptographic key in the active state and a dynamic key generated for each batch of manufactured items by employing a serialized code included in the cryptographic key;
providing the dynamic key for each batch of manufactured items to the verification centre;
marking each manufactured item with the ID code; and
counting the number of ID codes marked on the manufactured items,
wherein the verification centre encrypts the activation code with a public key of an asymmetric key pair associated with a certificate of the cryptographic key such that the activation code can be decrypted by the point in the supply chain using a private key of the asymmetric key pair associated with the certificate of the cryptographic key.

2. The method according to claim 1, wherein the cryptographic key is generated in a key generator separate from the point in the supply chain.

3. The method according to claim 1, wherein the activation code is decrypted by a code generator at the point in the supply chain using a private key of the asymmetric key pair associated with the certificate of the cryptographic key.

4. The method according to claim 1, wherein the generated ID codes are not stored.

5. The method according to claim 1, wherein the method is used for tax verification, the method further comprising:
reporting to a government authority the number of ID codes marked on the manufactured items; and
the verification centre storing information connecting the ID codes marked on the manufactured items to information specific to those manufactured items such that tax paid or owed can be verified against the actual number of items manufactured.

6. The method according to claim 5, wherein the reporting is performed per shipment and per excise warehouse such that tax paid or owed can be verified or calculated per shipment and per excise warehouse.

7. The method according to claim 1, wherein the method is used for tax verification, the method further comprising, before the step of generating an ID code for each manufactured item, the step of
   a government authority authorizing the point in the supply chain to generate a defined number of ID codes.

8. The method according to claim 7, further comprising, before the step of the government authority authorizing the point in the supply chain to generate a defined number of ID codes, the step of
   requesting the authorization from the government authority.

9. The method according to claim 7, further comprising
   reporting to the government authority the number of ID codes marked on the manufactured items.

10. The method according to claim 1, wherein the method is used for production volume verification, the method further comprising
    reporting to a third party the number of ID codes marked on the manufactured items.

11. The method according to claim 1, wherein the method is used for authenticating a selected manufactured item, the method further comprising:
    a user transmitting the ID code marked on the selected manufactured item to the verification centre;
    the verification centre deriving from the ID code, the cryptographic key and the dynamic key used to generate the ID code;
    the verification centre deriving from the cryptographic key and the dynamic key information relating to the selected manufactured item; and
    the verification centre transmitting at least some of the information relating to the selected manufactured item to the user.

12. An apparatus for marking manufactured items, comprising:
    a key generator for generating a cryptographic key, the cryptographic key having an active state and an inactive state;
    at least one point in a supply chain for the manufactured items, the key generator being arranged to send the cryptographic key, in the inactive state, to the point in the supply chain, wherein the point in the supply chain is arranged to receive, in response to the point in the supply chain transmitting information relating to the received cryptographic key, an activation code for activating the cryptographic key, the activation code allowing the cryptographic key in the inactive state to be activated to form the cryptographic key in the active state;
    a verification centre for verifying properties of the manufactured items, the key generator being arranged to provide the cryptographic key in the active state and the activation code to the verification centre,
    wherein the verification centre is structured to provide the activation code to the point in the supply chain by sending the activation code from the verification centre to the point in the supply chain;
    a code generator, at the point in the supply chain, for generating an identification (ID) code for each manufactured item, the ID code being derived from the combination of the cryptographic key in the active state and a dynamic key generated for each batch of manufactured items by employing a serialized code included in the cryptographic key, wherein the dynamic key for each batch of manufactured items is provided to the verification centre;
    a marker at the point in the supply chain for marking each manufactured item with the ID code; and
    a counter for counting the number of ID codes marked on the manufactured items,
    wherein the verification centre is structured to encrypt the activation code with a public key of an asymmetric key pair associated with a certificate of the cryptographic key such that the activation code can be decrypted by the code generator using a private key of the asymmetric key pair associated with the certificate of the cryptographic key.

13. A method suitable for tax verification comprising:
    providing a cryptographic key in an inactive state to a point in a supply chain for manufactured items;
    providing to a verification centre the cryptographic key in an active state and an activation code for activating the cryptographic key in the inactive state to form the cryptographic key in the active state;
    transmitting information relating to the received cryptographic key from the point in the supply chain to the verification centre;
    providing the activation code to the point in the supply chain in response to the point in the supply chain transmitting information relating to the received cryptographic key, the activation code allowing the cryptographic key in the inactive state at the point in the supply chain to be activated to form the cryptographic key in the active state;
    wherein the step of providing the activation code to the point in the supply chain comprises encrypting the activation code in the verification centre with a public key of an asymmetric key pair associated with a certificate of the cryptographic key such that the activation code can be decrypted by the point in the supply chain using a private key of the asymmetric key pair associated with the certificate of the cryptographic key, and then sending the encrypted activation code from the verification centre to the point in the supply chain;
    generating a plurality of identification (ID) codes for the manufactured items, wherein each ID code of the plurality of ID codes is derived from a cryptographic key in an active state and a dynamic key generated for each batch of manufactured items via a serialized code included in the cryptographic key;
    providing the dynamic key for each batch of manufactured items to the verification centre;
    marking each manufactured item with an ID code of the plurality of ID codes;
    counting the actual number of ID codes of the plurality of ID codes marked on the manufactured items, wherein the actual number of ID codes is the same as or less than the plurality of ID codes;
    reporting to a government authority the actual number of ID codes marked on the manufactured items; and
    storing information connecting the ID codes marked on the manufactured items to information specific to those manufactured items, such that tax paid or owed can be verified against the actual number of items marked.

14. The method according to claim 13, further comprising, before the step of generating a plurality of ID codes for the manufactured items:
    requesting authorization from a government authority to generate ID codes for the manufactured items; and
    receiving authorization from the government authority to generate a defined number of ID codes for the manufactured items.

* * * * *